Jan. 29, 1935.   J. F. MANSFIELD   1,989,328
MIRROR CLOCK
Filed March 25, 1930

INVENTOR.
James F. Mansfield
BY Cornelius Zabriskie
ATTORNEY.

Patented Jan. 29, 1935

1,989,328

UNITED STATES PATENT OFFICE 1,989,328

MIRROR CLOCK

James F. Mansfield, Garden City, N. Y.

Application March 25, 1930, Serial No. 438,702

6 Claims. (Cl. 45—97)

This invention relates, generally speaking, to automobile mirrors which are adapted to be mounted particularly on closed cars within the body of the car and above the windshield, so that the driver of the car may glance at the mirror from time to time in order to watch traffic in the rear through the rear window of the car body.

The object of the present invention is to provide a simple and efficient means for associating an automobile clock with such a mirror whereby when the driver of the car glances at the mirror, he may also ascertain the time of the day.

In the preferred, practical embodiment of the invention, the assembly comprises a plate glass mirror adjacent one end of which the silver coating is omitted or removed to provide a circular transparent portion preferably of circular contour and of a size corresponding to the size of a clock dial. This portion may be flush with the face of the plate from which the mirror is formed or it may be hollowed out or depressed slightly to accommodate the bezel and the hands of the clock. The clock which may be in the form of a conventional watch is adapted to be held in cooperative relation with the transparent portion of the mirror by means of a metal casing adapted to house the clock and provided therein with an opening through which the winding stem projects into accessible position. This casing is preferably closed at its back, but has an open front to engage with the rear face of the mirror in face abutting relation. The open side of the casing is flanged to bear against the mirror and the flanges are extended to form hook shaped fingers which reach about and grip the adjacent edges of the mirror for the purpose of mounting the casing thereon and thus holding the clock in cooperative relation with the transparent portion of the mirror. Said portion of the mirror is preferably depressed as stated, although the mirror may be of uniform thickness throughout. In order to eliminate the vibration due to a loose mounting of the clock within the casing, I preferably position an elastic gasket or pad such as one or more felt disks between the back of the clock and the back wall of the casing, so that when the parts are assembled on the mirror, all of said parts are under more or less compression, so that vibration is damped and the clock will be held firmly in position.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1:
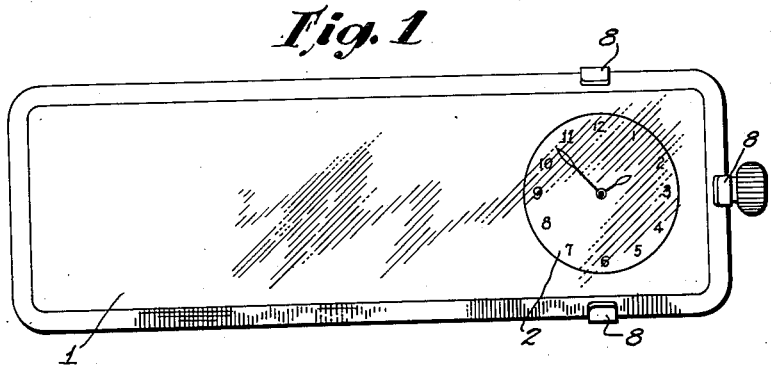
Figure 1 is a face view of the assembly embodying the present invention.
Figure 2:
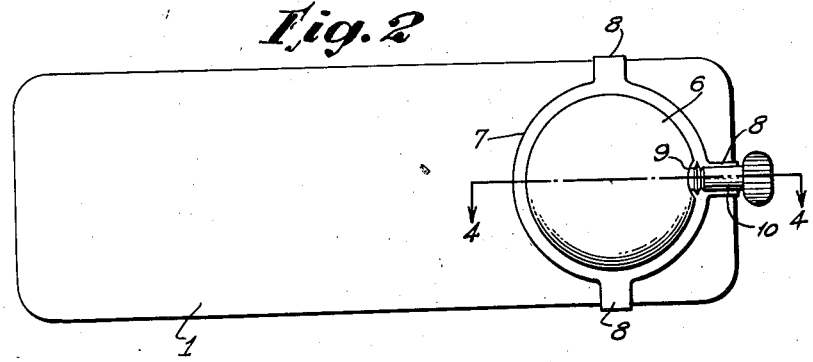
Figure 2 is a back view of the construction.
Figure 3:
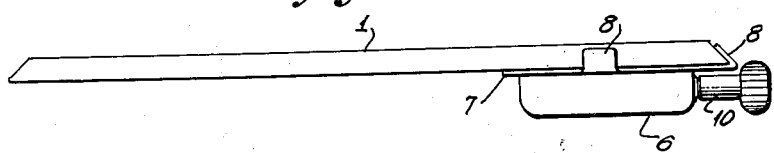
Figure 3 is an edge view.
Figure 4:
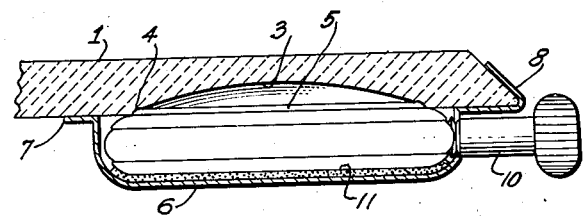
Figure 4 is a longitudinal section on the line 4—4 of Figure 2.

Referring to the drawing, 1 designates a mirror formed from plate glass, the back of which is silvered and thereafter provided with a protective coating of lacquer. The edge of the mirror is preferably beveled, although the present invention is not limited in this regard. Adjacent one end of the mirror 1 is an unmirrored portion 2 which is transparent. This portion may be flush with the back face of the mirror, but a much superior structure results if it is provided with a "punty" to form a recess or depression, around the margin of which is formed a peripheral channel or seat 4 as shown best in Figure 4. This channel is of such shape and size that it will conform to and form a seat for the bezel 5 of a watch. The watch is adapted to be positioned with its bezel seated in the channel 4 and with the remainder of the watch housed within a casing 6 which is preferably formed of sheet metal and of a size to closely conform to and house the watch. The casing is substantially circular with a closed back and an open front, and around the edge of the open front is a flange 7 adapted to seat against the back surface of the mirror. This flange is provided with extensions 8 which are returned upon themselves to form hooks, so positioned and disposed that they will hook about the contiguous edges of the mirror as shown best in Figures 1, 2 and 3. Three hooks may be conventionally employed, the two hooks which are oppositely disposed are adapted to engage with the upper and lower edges of the mirrors while the third hook is adapted to engage with the end of the mirror as shown. The end of the casing contiguous to the said third hook is provided with an opening 9 through which the winding stem of the watch movement is adapted to project into radial accessible position.

Interposed between the back of the watch and the base of the casing is a felt gasket or disk 11 and all the parts are so proportioned and disposed that after the watch has been placed in the casing, the casing may be slipped edgewise into cooperative relation with the mirror by sliding the transversely disposed hooks along the upper and lower edges of the mirror until the end hook engages with the end of the mirror. When the parts have been thus brought into position, the dial of the watch will register with the transparent portion of the mirror, while the bezel will be in engagement with the seat 4. The casing is preferably made of relatively light sheet metal and this together with the resilient character of the felt gasket will cause the casing and hooks to be placed under slight tension when attached to the mirror as stated, so that the parts will fit sufficiently tight to preclude vibration between them. The watch will thus be held firmly in position in the mirror, but in a manner to permit of its manual removal if this should be desired at any time.

The structure which I have described is highly efficient for the performance of its intended functions. It is economical to manufacture and neat and pleasing in appearance. The clock may be removed at any time for adjustment, repair or replacement, and the attaching devices are so disposed as not to be apparent to the casual observer. The transparent portion of the mirror is preferably recessed, as stated, to allow sufficient space for the operation of the hands of the watch and to minimize undesirable refraction. By providing this recess, I may employ a conventional watch. The back face of the mirror may, however, be flush throughout, and to provide for sufficient space of the operation of the hands a bezel may be employed of slightly greater dimension than the conventional bezel. For the reasons stated, the invention is to be understood as fully commensurate with the appended claims.

Having thus fully described the invention, what I claim as new and desire to secure by Letters Patent is:

1. Means for mounting a dial instrument behind a panel comprising a transparent concavity in said panel, said concavity being substantially the size of the instrument dial, and a casing adapted to enclose the instrument and provided with gripping fingers embracing the edges of the panel to mount the casing in position on the panel with the instrument held firmly with its dial in registration with the concavity, said concavity being provided about its margin with an annular seat to receive the bezel of the instrument for the purpose of centering the instrument with respect to said concavity.

2. Means for supporting a watch behind a transparent panel comprising a one-piece integral holder to contain the watch and provided with an open side adapted to abut the back of the panel, and a plurality of hook shaped fingers integral with the one piece holder and extending therefrom to and about opposite edges of the panel with their end portions bent inwardly to overlie the panel for the purpose of maintaining the holder in firm face abutting relation to the panel.

3. Means for supporting a watch behind a transparent panel, comprising a one-piece integral holder to contain the watch, said holder having an opening through which the winding stem of the watch may project into accessible position and also having an open side adapted to abut the back of the panel, a plurality of hook shaped fingers integral with the one-piece holder and extending therefrom to and about opposite edges of the panel with their end portions bent inwardly to overlie the panel for the purpose of maintaining the holder in firm face abutting relation to the panel, and yieldable cushioning means within the holder to bear against the watch and cushionably hold it against rattling.

4. Means for supporting a watch behind a transparent panel, comprising a one-piece integral holder to contain the watch, said holder having an opening through which the winding stem of the watch may project into accessible position and also having an open side adapted to abut the back of the panel, three hook-shaped fingers integral with the one-piece holder and extending in diverging relation therefrom, to and about three different edges of the panel with their end portions bent inwardly to overlie the panel for the purpose of accurately spacing the holder from said three edges of the panel and maintaining the holder in firm face abutting relation to the panel.

5. Means for supporting a watch back of an automobile rear view mirror comprising a one-piece integral holder to contain the watch and provided with an open side adapted to abut the back face of the mirror, said one-piece integral holder being integrally provided at its open side with an open ended pocket adapted to receive one end of the mirror with a sliding fit for the purpose of detachably supporting the holder with its contained watch upon the rear view mirror without the employment of attaching devices extraneous to said one piece holder.

6. Means for mounting a dial instrument behind a panel comprising a casing adapted to enclose the instrument and provided with gripping fingers embracing the edges of the panel to mount the casing in position on the panel, said panel having in the back face thereof a depressed seat shaped to receive the bezel of the instrument.

JAMES F. MANSFIELD.